United States Patent [19]
Korth

[11] Patent Number: 5,327,223
[45] Date of Patent: Jul. 5, 1994

[54] METHOD AND APPARATUS FOR GENERATING HIGH RESOLUTION OPTICAL IMAGES

[75] Inventor: Hans-Erdmann Korth, Stuttgart, Fed. Rep. of Germany

[73] Assignee: International Business Machines Corporation, Armonk, N.Y.

[21] Appl. No.: 901,334

[22] Filed: Jun. 19, 1992

[30] Foreign Application Priority Data

Aug. 27, 1991 [EP]  European Pat. Off. ........ 91114365.9

[51] Int. Cl.⁵ .............................................. G01B 9/02
[52] U.S. Cl. ..................................... 356/359; 356/345
[58] Field of Search ............... 356/345, 354, 355, 356, 356/359, 360

Primary Examiner—Samuel A. Turner
Assistant Examiner—Robert Kim
Attorney, Agent, or Firm—Francis J. Thornton; James M. Leas

[57] ABSTRACT

A microscope interferometer is described, that scans an object surface through a membrane mask with a multitude of pinholes. Light reflected back through the pinholes interferes with the darkfield image of the mask surface. The mask to object separation can be stabilized by an air flow through the pinholes. Image processing techniques allow to overcome the Abbe diffraction limit for the lateral resolution.

14 Claims, 3 Drawing Sheets

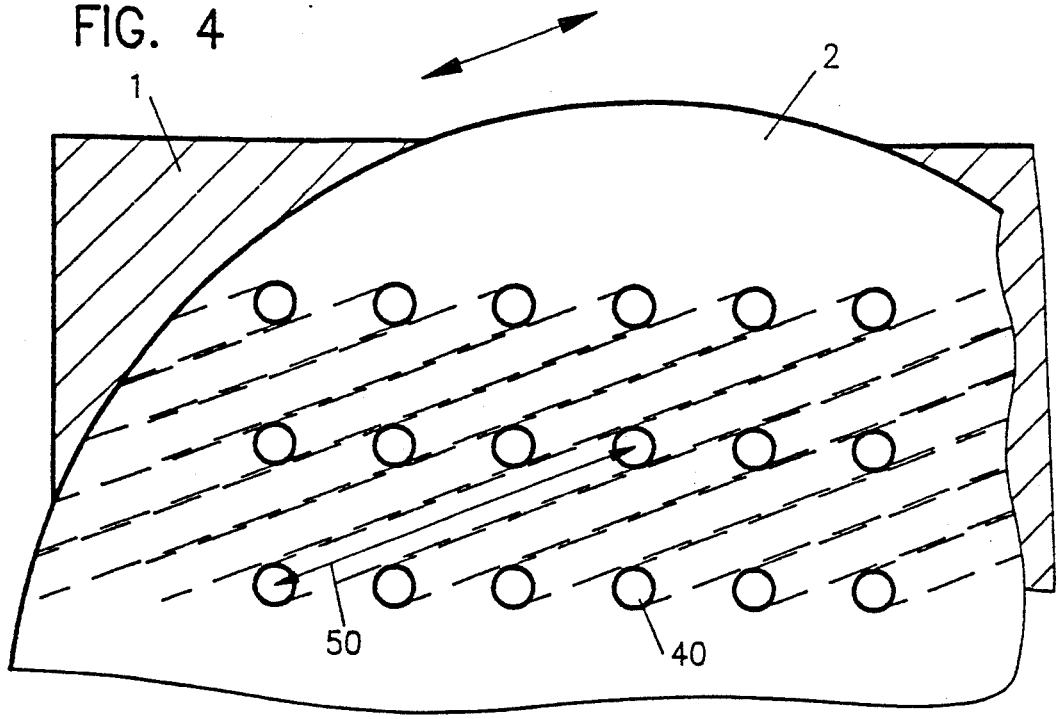
FIG. 4
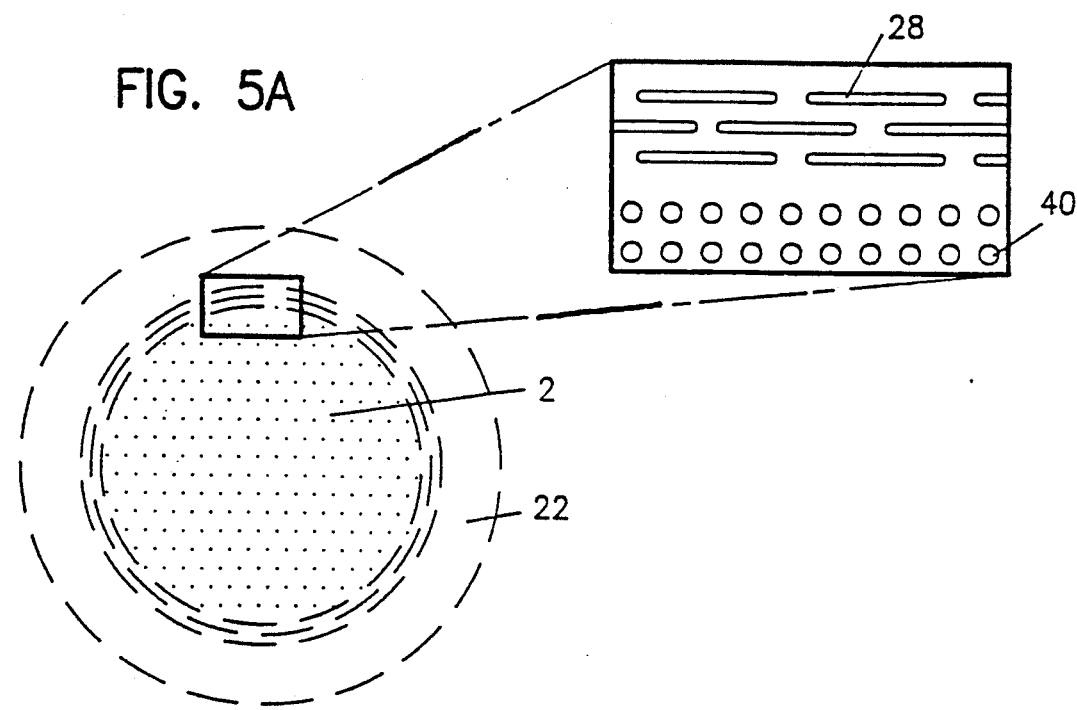
FIG. 5
FIG. 5A
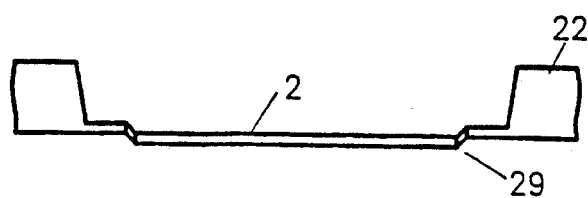
FIG. 5B

METHOD AND APPARATUS FOR GENERATING HIGH RESOLUTION OPTICAL IMAGES

BACKGROUND OF THE INVENTION

1. Field Of The Invention

The present invention lies in the field of optical imaging systems. More specifically the invention concerns magnifying systems like high resolution optical microscopes.

2. DESCRIPTION OF THE PRIOR ART

There exists a great variety of optical magnifying systems using classical optical elements like lenses, prisms and mirrors. The imaging characteristics can be designed for different purposes, e.g. including color filtering, polarizing or darkfield imaging. All these systems have in common that objects or details having a size close to or below the wavelength of illuminating light can't be resolved due to light diffraction phenomena. Thus standard microscopes, which use lenses for magnifying small objects, are limited in resolution due to wave characteristics of light. This limiting effect is expressed in the well known theorem of Abbe, which describes the maximum achievable lateral resolution of imaging systems as a function of the wavelength of the light and the aperture of the optical system.

Recently a new type of instrument was disclosed by D. W. Pohl, U. Ch. Fischer and U. T. Duerig, "Scanning near-field optical microscopy (SNOM): basic principles and some recent developments", Society of Photo-Optical Instrumentation Engineers, Scanning Microscopy Technologies and Applications, 1988, pp. 84–90, which was capable of resolving details below the wavelength of illuminating light, thus overcoming Abbe's criterion. The underlaying concept of this specific non imaging system is the illumination of an object through a pinhole having an aperture diameter of only a fraction of the light wavelength. This pinhole is placed next to the surface of an investigated object. Backscattered light from the object's surface can be detected through the pinhole. For very thin objects transmitted light can be detected alternatively from the backside of the object. A full picture of at least parts of the object is generated by scanning the pinhole over the object thus sequentially receiving intensity fluctuations of detected light due to variations of the object's reflectivity or transmittance respectively.

Although a very high resolution can be achieved with this pinhole system there are still some inherent restrictions to consider.

For maximum resolution the distance between pinhole and object surface should not exceed the pinhole diameter.

A considerable time is required to generate an image by mechanical scanning. Drift and distortion must be controlled.

Reflection objects must be illuminated and sensed by the same pinhole. The very small amount of light that finds its way back through the pinhole is overlaid by unwanted backside reflections.

Phase objects (e.g. surface micro-roughness) cannot be detected directly. Some depth information can only be derived from the signal intensity, that decreases as a function of the distance between pinhole and object surface.

It is the object of the present invention to disclose an improved device, that allows real-time imaging of surface contour and reflectance information with a lateral resolution that overcomes the Abbe diffraction limit.

SUMMARY OF THE INVENTION

The present invention is a mask microscope interferometer that scans an object's surface through a membrane mask with a multitude of pinholes.

It is a well known fact, that light can pass through pinholes having a diameter of only a fraction of the light wavelength. However, the light intensity decreases rapidly with the depth of the pinhole and the decreasing diameter. If there is a reflecting object next to the end of the pinhole, the light will be reflected back up again. Light reflected back through the pinholes interferes with the light reflected from the mask surface. The interference between light from the top and the bottom of the pinholes produces a dramatic amplification, due to the superposition of the signal amplitudes: An effective bottom reflectance of e.g. 1% of the top reflectance yields a 20% increase of the total signal, when in phase. Counterphased signals produce a 20% decrease. If top and bottom amplitude are in quadrature, i.e. they differ by a phase of 90 degrees, the observed intensity becomes virtually independent from the bottom reflectance. Therefore, the intensity will vary with the path difference between top and bottom reflection.

Although there is a narrow gap between the pinhole and the reflecting surface most of the light will be reflected back. Amplitude and phase will be averaged over the probed area. Only a small fraction of the light may escape into the gap between pinhole and object surface.

To use the parallel processing capability of the inventive mask microscope, an array of pinholes may be used for simultaneous probing at a multitude of object locations. Assuming a light wavelength of some 500 nm and an imaging system with a spot resolution better than 1 micron and an object field diameter of some 50 $\mu$m, a raster of pinholes with 1 micron separation will allow virtually independent probing. The pinhole diameter may be 100 nm or less.

Pinhole arrays may be prepared e.g. as silicon membranes. Such membranes can be produced with excellent surface smoothness.

The thickness may be less than a micron, depending on the stability requirements. The high absorption of silicon minimizes signal distortion due to transmitted light. A further reduction of transmittance and a reduction of the thermal load of the membrane can be affected by high reflectance overcoat of the membrane. The pinhole raster may be produced by electron-beam lithography.

The separation between pinholes and object surface should not be much wider than the pinhole diameter. To stabilize this separation across the image field may be a problem, if the various attractive and repulsive forces between membrane and object are considered (van der Waals force, electrostatic force, capillarity, etc.). A gas flow through the pinholes will introduce a stabilizing force using the Bernoulli effect: If membrane and object are in close contact, a repulsive force proportional to the gas pressure and the pinhole surface coverage will build up. If membrane and object are separated to allow a gas flow between the surfaces, there will be an attractive force that depends on the flow velocity and the pressure gradient. The effect will use the flexibility of the mask to match the contour of the object surface.

The gas film will suppress friction effects that may damage membrane or object. Moreover, the gas flow will suppress the buildup of humidity in the membrane-object gap. Due to the small object field (e.g. 50 μm) even very thin membranes can withstand a pressure gradient of some atmospheres.

An annular suspension element may be used to hold the pinhole mask flat, but allowing easy reaction to the external forces. This will protect the mask from accidental destruction due to inadvertent focusing movements. Suspension structures of appropriate stiffness may be etched directly into the silicon mask carrier. Appropriate damping of the suspension will be required to avoid oscillations of the mask. This may be achieved with a high viscosity fluid (e.g. photoresist) that fills the etch grooves of the suspension. Damping should not be critical, since the resonance frequency of a pinhole mask with a diameter of some 50 microns can be assumed in the 100 kHz range, whereas mask-to-object settling motions should not exceed some 10 Hz.

The pinhole array will be imaged by the microscope into an image plane. A photo sensor. e.g. a CCD camera senses the image. A frame corresponds to the object response at the current pinhole array location. When the pinhole mask is scanned to cover the whole object, a sequence of frames can be acquired. When the frames are correlated with the mask position, an image of the surface with high lateral resolution can be generated.

A unidirectional lateral wobble movement between membrane mask and the inspected object allows a fast imaging of the whole object surface. Even if no scanning motion is applied, a local full imaging is achieved when a periodic pinhole array (e.g. rectangular or hexagonal) is used and when the wobble direction is slightly inclined with respect to a symmetry axis of the mask. The wobbling amplitude depends on the pinhole diameter to pinhole distance ratio.

For scanning motion and/or generation of wobbling motion between object and membrane mask the object can be mounted on a support comprising e.g. piezo positioning means. With such an arrangement also distance and coplanar orientation of the object with respect to the membrane mask can be adjusted, preferably by means of a controlling unit.

With an object of e.g. 50 by 50 pinholes a camera with a matching number of sensing elements can be used. A sequence of frames has to be taken for a full image. For standard TV data rates the pinhole array has to be scanned at a rate of a few ten Hz. The scan length may be some 10 μm, the scan speed a few hundred μm/sec.

A direct visualization of the object can be achieved, when a second matching pinhole mask is placed in the intermediate image plane. When this mask is scanned in synchronization with the object mask, a high resolution image can be perceived. Obviously, the term 'matching' here indicates that the mask dimensions and scanning movement match the magnification of the imaging system. Loss of light can be avoided, if instead of the matching pinhole mask, a fly-eye lens is used to de-magnify the diffraction disklets of the pinhole images to their geometrical size.

The amplitude of the light that returns through the pinhole depends on the reflectance and phase in the illuminated surface area. The contribution of surface elements in the 'shadow' zone of the pinhole decreases rapidly as a function of the geometrical orientation, the pinhole-to-object gap and the polarization state of the incident light. For a gap that equals the pinhole diameter the lateral resolution will be approximately identical with the pinhole diameter.

The coupling into the gap depends on the polarization state of the incident light, that does not allow a propagation in the direction of the E-vector plane. For polarized light, therefore, the lateral resolution will be anisotropic. An overall increase in resolution can be achieved by sequential or color coded evaluation of both polarization states.

Surfaces waves (gap modes) may be exited if the distance between the pinholes in a pinhole array becomes equal to the light wavelength or a multiple thereof. They can be suppressed, if the pinhole distance is an odd multiple of half the wavelength. This condition may be fulfilled for two perpendicularly polarized beams of different wavelength.

To maximize the throughput of the microscope interferometer, the separation between adjacent pinholes should be as small as possible. The minimum distance is given by the resolution of the image lens. The diffraction disklets of the pinholes are preferably imaged onto the sensor array in a way that allows to separate them. Crosstalk between adjacent sensors can be reduced by computational deconvolution techniques. In contrast to conventional imaging techniques, this will be facilitated by the fact that the phase of the light from the object space remains virtually constant (the 'reference' beam amplitude is always large in comparison to the object beam).

For a better understanding of the present invention, together with further objects and advantages, a preferred embodiment of the invention is described in the following with reference to the accompanying drawings, in which:

DESCRIPTION OF THE DRAWINGS

FIG. 4 shows the wobbling movement of the mask with respect to the object's surface;

FIG. 5a shows the membrane mask with an enlarged section of the periphery zone of the mask; and FIG. 5b shows a cross-section view of the membrane mask.

FIG. 5 shows a detail view of a portion of the mask illustrated in FIG. 5a.

DESCRIPTION OF THE PREFERRED EMBODIMENT

In the preferred embodiment a darkfield arrangement with a plane pinhole mask in the object plane is used as a superresolving probe for object reflectance and phase.

In a darkfield arrangement only the diffracted light is contributing to the image. Such a setup can suppress the light from the pinhole carriers top surface very efficiently, leaving only the diffracted light.

Figure 1:
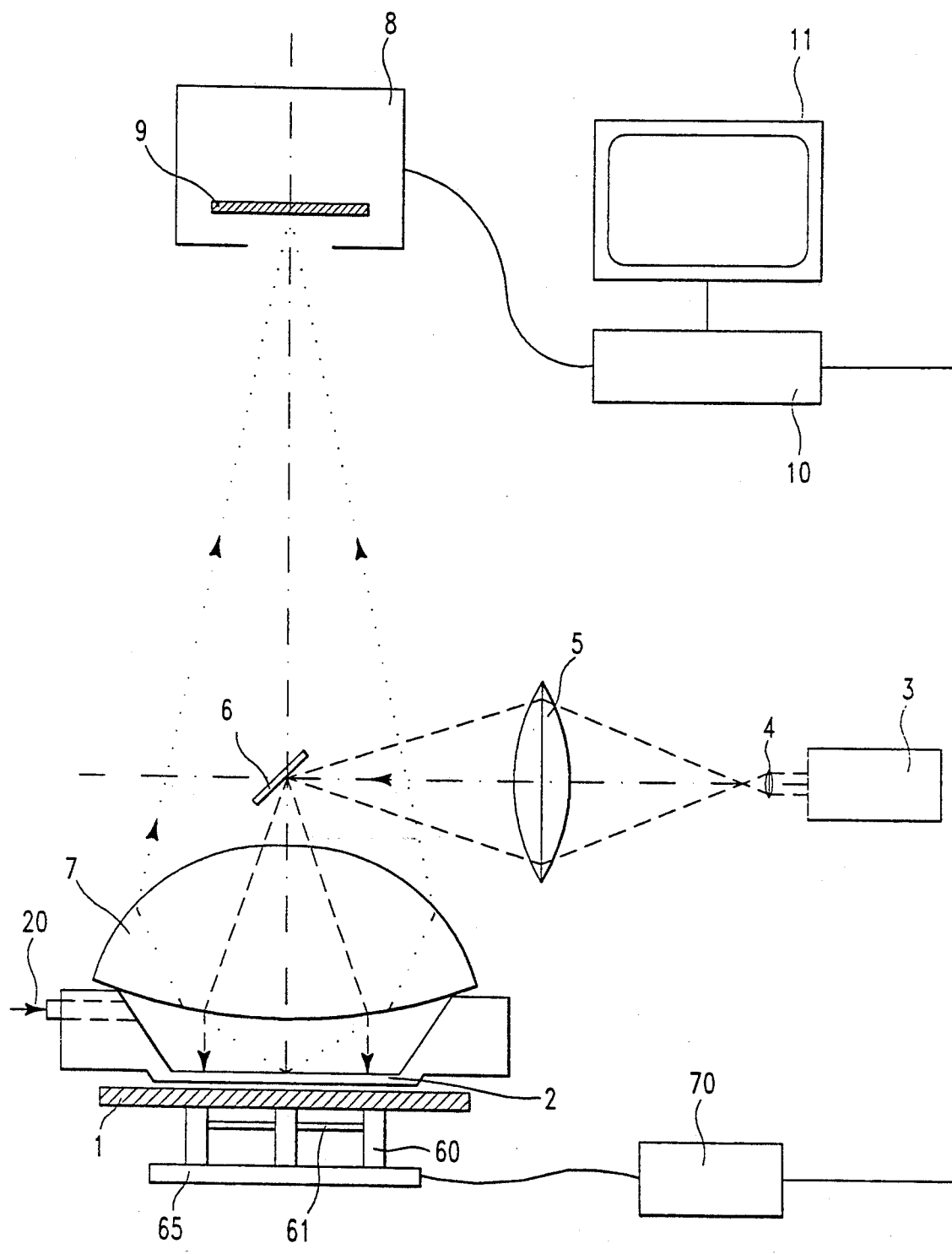
FIG. 1 shows the preferred embodiment of the membrane mask microscope.
Figure 2:
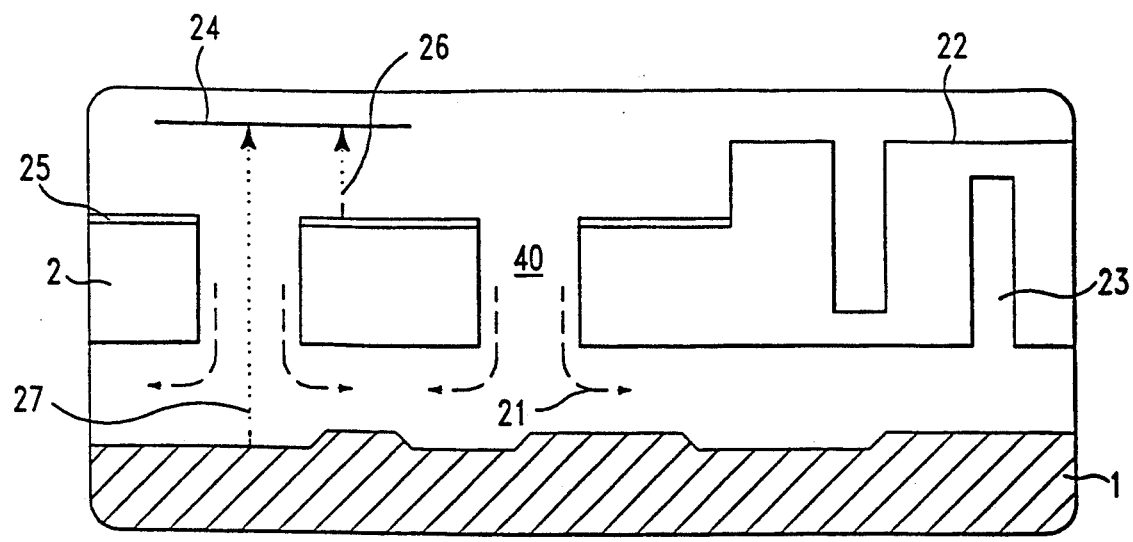
FIG. 2 shows an enlarged cross-section view of the membrane mask juxtaposed to the object's surface.

As shown in FIGS. 1 and 2, light is emitted from a source 3, focussed through lenses 4, 5 to a mirror 6 and directed through lens 7 onto the backside of a membrane mask 2. Light passing through pinholes in the membrane mask illuminates the surface of an object 1. In this arrangement interference 24 occurs between light 27 reflected from the object's surface that passes back again through the pinholes, and light 26 reflected directly from the backside of the membrane mask 2. Zero order interferences are directed by lens 7 onto mirror 6 and thus excluded from image generation. Higher order interferences are projected by lens 7 to a usual CCD array 9 of photosensor 8. Signals of the photosensor are transferred to an image processor 10. The reconstrued image of the inspected surface can be viewed finally on monitor 11.

Object 1 is mounted on a support 65 including piezo elements 60, 61. Scanning motion and wobbling of the object is controlled by unit 70 which is connected to image processor 10 for synchronization of object movement and image generation.

Lens 7 and the stiff outer part of the membrane mask 2 form a cavity and gas under pressure entering through an inlet 20 only can leave through the pinholes 40 of the membrane mask thereby generating a gaseous layer 21 between membrane mask and the surface of object 1. The membrane mask 2 is covered with a high reflective layer 25 to enhance interference 24 between light 26 reflected from backside of the membrane mask and light 27 reflected from the object's surface. Grooves 23 cut in the peripheral region 22 of the membrane mask enhance the flexibility of the membrane mask.

Figure 3:
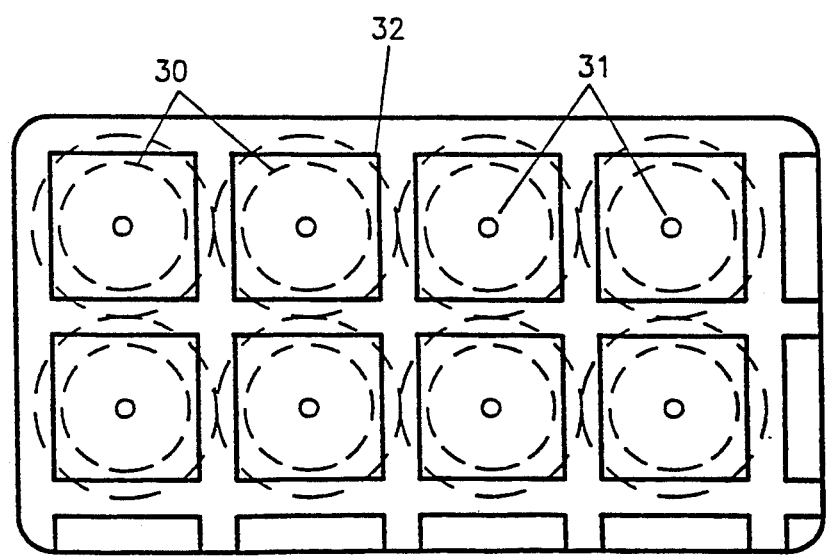
FIG. 3 shows a section of CCD array to which images of pinholes of the membrane mask are projected.

FIG. 3 is an enlarged view of CCD array 9. Diffraction disklets 30 resulting from interference 24 are projected to the light sensitive detectors 32 of CCD array 9. The geometrical images 31 of the pinholes are centered with respect to each single diffraction disklet 30.

FIG. 4 demonstrates the full imaging of the object's surface by a laterally wobbling motion between membrane mask 2 and the object. The direction of the wobbling motion of the object 1 is slightly inclined with respect to the geometric orientation of the pinhole array. Due to oscillation 50 of pinhole positions 40 a local part of the surface is covered even if scanning is occasionally stopped.

As shown in FIG. 5 and FIG. 5a the membrane mask 2 of the preferred embodiment has a circular shape. In this example slits 28 are integrated in the peripheral region or support ring 22 to enhance the mechanical flexibility of the mask. The cross sectional view of FIG. 5b shows the membrane mask 2 is lower than the support ring 22.

The disclosed membrane mask microscope allows realtime visualization of object structures that were not accessible to optical inspection up to now. No object preparation or vacuum environment are required. Spectroscopic analysis can be done. Interferometric phase measurements can generate accurate surface profile data.

Critical dimension measurements on semiconductors and photolithography masks become feasible for deep-UV and X-ray lithography.

In comparison to alternative devices the described membrane mask microscopy will be highly cost efficient, as it is built from components that are readily available. The preparation of silicon masks and microstructures has been mastered for other applications.

Image generation by the new membrane mask microscope is more or less identical to the operation of a TV microscope and requires no special skills.

What is claimed is:

1. A method for achieving a high resolution optical image of a surface of an object comprising the steps of:

providing a membrane mask having a plurality of pinholes, the object and said mask located so that the surface of the object can receive light through said pinholes;

illuminating said mask and said object through said pinholes;

collecting light reflected from the object, passed through said pinholes, and interfering with light reflected from said mask;

processing the collected light in an image process; and displaying the image.

2. The method according to claim 1, wherein there is further included the step of laterally oscillating said object with respect to the mask.

3. The method of claim 2, wherein there is further provided the step of providing a second mask in an image plane between said first mask and said second mask and moving said second mask laterally in synchronization with said first mask.

4. The method of claim 3, wherein there is further provided the step of directing gas flow through said pinholes onto the surface of said inspected object.

5. The method of claim 2 wherein there is further provided the step of moving said object with respect to the first mask.

6. A system for high resolution optical inspection of an object, comprising:

a light source;

a membrane mask provided with a plurality of pinholes juxtaposed to a surface of the object, said mask further comprising a reflective backside;

means for projecting light form said light source to said mask and to the object through said pinholes in said mask;

means for projecting interference formed form superposition of light reflected from said mask and light reflected from the object through pinholes in said mask to a photosensor;

said photosensor coupled to a processing unit for receiving signals from said photosensor; and image generation means coupled to said processing unit.

7. The system according to claim 6, wherein said pinholes have a diameter equal to or less than the wavelength of the light radiated by said light source.

8. The system according to claim 7, wherein a surface of said membrane mask is covered with a high reflective layer.

9. The system according to claim 6, wherein said object is supported by piezo material positioning means.

10. The system according to claim 9, further comprising a processing unit for controlling said positioning means to adjust the position and movement of the object.

11. The system according to claim 6, wherein said interference is other than the zeroth order interference.

12. The system according to claim 11, wherein said means for projecting interference formed superposition of light reflected from said mask and light reflected from the object projects a plurality of interference orders.

13. The system according to claim 6, wherein said photosensor comprises an array of photosensors.

14. The system according to claim 13, wherein said array of photosensors comprises a charge coupled device.

* * * * *